US008820216B2

(12) United States Patent
Vuagniaux et al.

(10) Patent No.: US 8,820,216 B2
(45) Date of Patent: Sep. 2, 2014

(54) OPENING MEANS FOR A CAPSULE-BASED BEVERAGE PREPARATION DEVICE (75) Inventors: Didier Vuagniaux, Gimel (CH); Matthieu Ozanne, Chessel (CH); Gilles Gerber, Lutry (CH); Remo Dunki, Vevey (CH)

(73) Assignee: Nestec S.A., Vevey (CH)

( * ) Notice: Subject to any disclaimer, the term of this patent is extended or adjusted under 35 U.S.C. 154(b) by 288 days.

(21) Appl. No.: 13/375,390

(22) PCT Filed: Jun. 17, 2010

(86) PCT No.: PCT/EP2010/058506
§ 371 (c)(1),
(2), (4) Date: Nov. 30, 2011

(87) PCT Pub. No.: WO2010/146101
PCT Pub. Date: Dec. 23, 2010

(65) Prior Publication Data
US 2012/0067223 A1    Mar. 22, 2012

(30) Foreign Application Priority Data

Jun. 17, 2009   (EP) ..................................... 09162921

(51) Int. Cl.
*A47J 31/06*        (2006.01)
*B65D 85/804*       (2006.01)

(52) U.S. Cl.
CPC ......... *A47J 31/0673* (2013.01); *B65D 85/8043* (2013.01)
USPC ................ 99/295; 99/302 P; 99/323; 426/77; 426/82

(58) Field of Classification Search
USPC ...................... 99/295, 302 P, 323; 426/77, 82
See application file for complete search history.

(56) References Cited

U.S. PATENT DOCUMENTS

| 3,260,190 | A  | * | 7/1966  | Levinson ......................... 99/295 |
| 3,470,812 | A  | * | 10/1969 | Levinson ......................... 99/295 |
| 5,656,316 | A  |   | 8/1997  | Fond et al. |
| 5,899,137 | A  | * | 5/1999  | Miller et al. .................... 99/295 |
| 6,854,378 | B2 | * | 2/2005  | Jarisch et al. ................... 99/295 |
| 6,997,103 | B2 | * | 2/2006  | Shaw et al. ..................... 99/295 |

(Continued)

FOREIGN PATENT DOCUMENTS

| CA | 2067515 | 11/1992 |
| EP | 0512468 | 11/1992 |
| EP | 0512470 | 11/1992 |

(Continued)

OTHER PUBLICATIONS

PCT International Search Report for Application No. PCT/EP2010/058506 mailed on Jun. 17, 2010.

*Primary Examiner* — Reginald L Alexander
(74) *Attorney, Agent, or Firm* — K&L Gates LLP (57) ABSTRACT

The invention proposes a system comprising a beverage preparation device (10) and a capsule (1) for preparing a beverage from a food substance contained in a compartment (2) of the capsule by injection of a liquid into the capsule, the beverage preparation device (10) having opening means (3) which are designed to interact with a wall member (4) provided at an outlet face (6b) of the capsule (1), wherein the opening means (3) comprise an opening member (7) having a hook-like shape designed to shear and move away at least a portion of a cover (11) sealed to the outlet face (6b) of the capsule.

16 Claims, 5 Drawing Sheets

(56) References Cited

U.S. PATENT DOCUMENTS 7,640,842 B2 * 1/2010 Bardazzi ........................ 99/295
2002/0148356 A1 10/2002 Lazaris et al.
2002/0148357 A1 10/2002 Lazaris et al.
2009/0007793 A1 1/2009 Glucksman et al.

FOREIGN PATENT DOCUMENTS

| EP | 1894853 | 3/2008 |
|----|---------|--------|
| EP | 1950150 | 7/2008 |
| GB | 1397116 | 6/1975 |
| WO | 2007042414 | 4/2007 |

* cited by examiner

OPENING MEANS FOR A CAPSULE-BASED BEVERAGE PREPARATION DEVICE

CROSS REFERENCE TO RELATED APPLICATIONS

The present application is a National Stage of International Application No. PCT/EP2010/058506, filed on Jun. 17, 2010, which claims priority to European Patent Application No. 09162921.2, filed on Jun. 17, 2009, the entire contents of which are being incorporated herein by reference.

FIELD OF THE INVENTION

The present invention relates to a capsule for preparing and delivering a beverage in a beverage preparation device. The present invention more particularly aims at providing opening means suitable for opening a capsule to create a beverage outlet with enhanced liquid ejection characteristics.

BACKGROUND OF THE INVENTION

Capsules containing roast and ground coffee in which hot water flows under gravimetric force through the capsule are known from the prior art. A capsule of this general type is described in British Patent No. 1397116. In this method, water is injected from the top of the cartridge and flows down through the ground coffee, through a filter and finally through a piercing hole or holes of the bottom side. More sophisticated systems are based on a similar approach using trunco-conical cartridges such as in US 2002/0148356 or using rectangular cartridges such as in US 2002/0148357.

One commercially successful capsule system for extracting coffee beverage from capsules consists in placing an air- and water-impermeable capsule into an extraction device, injecting hot water into the capsule until the internal pressure in the capsule reaches the value at which a closing membrane is torn or pierced so that liquid extract can be released out of the capsule. A capsule adapted for such a process of extraction is described in EP 0 512 468. The process itself is described in EP 0 512 470. This method provides a high quality espresso-type coffee. The ground coffee is filled in the capsule fresh and can be stored many months without significant loss of aroma. The release of the coffee is slightly delayed due to a retarded opening of the membrane under pressure from the time water starts to be injected in the capsule. As a result, coffee can be fully extracted under optimal pressure and heat conditions. A stable and thick crema or foam is also produced due to high stress, pressure release and gas-entrapment conditions which are specific to this method.

However, such capsule and process are not optimal for carrying out the infusion or brewing of beverages such as tea or herbal tea.

Therefore, capsules containing leaf tea products and the like have been introduced to the market. It should be understood that the quality of a tea beverage to be prepared is highly dependent on the quality of the leaf tea ingredients, i.e., the tea origin used (soil, drying, blending, etc.) and their storage conditions. For instance, tea ingredients are usually sensitive to oxygen and light. Preferred tea ingredients are taken from loose leaves, chiseled or broken in small fragments. However, brewing conditions are also important to take full advantage of the quality of the ingredients used.

Another problem with tea beverages resides in that taste cross-contamination must be preferably avoided. Taste cross-contamination happens when two capsules are sequentially brewed in the machine and when a taste residue is left by the first capsule on permanent parts of the machine that can consequently affect the taste of the second capsule which is brewed just after the first capsule. For tea, this can be an issue with certain tea varieties that deliver a high aroma profile such as mint tea or other highly flavoured varieties.

WO 2007/042414 A1 relates to a beverage preparation device and a dedicated capsule designed for delivering a brewed liquid at relatively low pressure and is more particularly suited for tea beverages. Thereby, the capsule comprises an enclosure containing one or more beverage ingredients, a filtering wall delimiting at least one filtering side of the enclosure, and an overflow wall that is positioned in the path of the brewed liquid after the filtering wall and which comprises at least one overflow aperture or is associated with at least one puncture means or, respectively, puncture indication means capable of producing or, respectively, indicating at least one overflow aperture.

OBJECT AND SUMMARY OF THE INVENTION

Based on the known prior art, the present invention aims at further enhancing the quality of the tea beverage to be prepared. Moreover, the invention aims at proposing a design of a capsule and a dedicated opening member of the beverage preparation device for enhancing and facilitating the preparation of a tea or herbal tea beverage.

In particular, an enhancement of the beverage ejection characteristics of the capsule is sought-after which avoids the creation of pressure when delivering the beverage out of the capsule.

The present invention further aims at other objects and particularly the solution to other problems as will appear in the rest of the present description.

It should be understood that in the present application, the term 'tea' encompasses all type of leaf tea such as green tea, black tea, white tea, chai tea, flavoured tea and herbal or fruit tea. Moreover, the term 'leaf tea' or 'leaf ingredient' refers to brewable tea or other ingredients in whatever form such as complete, cut or chiseled leaves, small fragments of leaves, powder or dust.

The above-outlined objects are especially achieved, according to a first aspect of the invention, by a system comprising a beverage preparation device and a capsule for preparing a beverage from a food substance contained in a compartment of the capsule by injection of a liquid into the capsule, the beverage preparation device having opening means which are designed to interact with a wall member provided at an outlet face of the capsule, wherein the opening means comprise an opening member having a hook-like shape designed to shear and move away at least a portion of a cover sealed to the outlet face of the capsule.

Accordingly, the opening means provide a cut at the cover sealed to the outlet face of the capsule in order to establish a liquid outlet for the beverage to be dispensed from the capsule.

The opening member is a hook-like member which is designed to deflect at least a portion of the cover towards an upper face of the hook-like member.

Accordingly, a sufficiently broad aperture is provided which avoids pressure rise within the capsule when delivering the beverage out of the capsule.

Accordingly, the ejection characteristics of the beverage from the capsule are enhanced. Thereby, no parts of the cover are obstructing the created beverage outlet and thus, whipping of the beverage to be dispensed from the capsule is prevented. Hence, no bubbles are created and a nice appear of the tea beverage is obtained.

Preferably, the opening means comprises an essentially longitudinal cutting edge.

The beverage preparation device may further be equipped with at least one enclosing member connected to a closing mechanism for selectively enclosing said capsule in a receiving chamber of the device. Moreover, the device may comprise an external or internal liquid supply and a pump connected to the liquid supply for supplying liquid to the receiving chamber.

In a preferred embodiment, the opening means are designed to be moveable relative to the capsule. Thereby, the opening means are preferably connected to the at least one enclosing member and hence, during a closure movement of the closing mechanism to which the enclosing member is connected, the opening means are brought to interact with the wall member provided at an outlet face of the capsule.

The hook-like member of the opening means is preferably curved or slanted with respect to the vertically arranged base of the opening means. Hence, deflection of the portion of the cover towards an upper face of the hook-like member is facilitated.

In a preferred embodiment, the hook-like member presents a longitudinal cutting edge. This edge may comprise a central recession which is formed in the longitudinal cutting edge. A shearing member of the wall member is preferably abutting on the cover. The shearing member is preferably wedge-shaped with its tip portion being able to slide in the recess formed in the longitudinal cutting edge of the hook-like member.

The shearing member may be of any other geometrical shape suitable for interacting with the essentially longitudinal cutting edge of the hook-like member.

Furthermore, the opening means preferably comprise integrally formed guiding means designed to redirect a beverage from the capsule to a receptacle. In a preferred embodiment, the guiding means comprise a collecting member situated at a basis of the opening means. Thereby, the collecting member may be a hopper-like recession designed for collecting the beverage which is being dispensed from the aperture created in the cover.

The hook-like opening member is preferably designed to be fully introduced into the cover to be pierced such that the guiding means abut onto the created outlet opening in the cover. Thereby, the created outlet opening is preferably arranged such that beverage being ejected through the created outlet opening is not obstructed by the opening member. Accordingly, the opening created in the outlet cover is not diminished by the opening means and hence, an enhanced flow rate of the beverage from the capsule is obtained.

Moreover, the guiding means preferably comprise an essentially vertical ridge protruding from the base of the opening means. Preferably the vertical ridge protrudes from the collecting member. Accordingly, beverage being dispensed from the outlet aperture of the capsule is collected by the collecting member and guided from the base of the opening means vertically downwardly towards a receptacle. Thereby, the beverage is guided by the vertical ridge towards a receptacle. In particular, any remaining drops are guided along the ridge by means of adhesion forces between the drops and the surface of the guiding means. The guiding ridge may as well be arranged slightly slanted with respect to the vertical.

The lower end portion of the guiding means is preferably constituted by means of a tip of the vertical ridge. Hence, the dispensed beverage runs down the ridge and is finally disconnected therefrom by means of gravity. Accordingly, no tube or tubular means have to be provided for guiding the liquids to the receptacle. Thus, cross contamination during use of different capsules with the beverage device is effectively prevented and hence, the brewed liquid can be dispensed properly and hygienically into a receptacle such as an underlying cup or mug.

In a second aspect, the present invention proposes a capsule for preparing a beverage in a beverage device comprising:

an ingredients compartment, a wall member provided at an outlet face of the capsule, the wall member comprising at least one overflow aperture in fluid communication with the ingredients compartment, a cover sealed to the outlet face and wherein the wall member comprises a shearing member abutting on the cover and designed to interact with dedicated opening means of the beverage preparation machine such that during opening of the machine at least a portion of the cover is sheared between the shearing member and the opening means.

Thereby, the shearing member is designed to interact with a longitudinal cutting edge of the dedicated opening means.

In a preferred embodiment, the cover is a mono-layer or a multi-layer cover. Thereby, the cover preferably comprises at least aluminum.

The wall member is preferably provided with at least one preformed channel at the outlet face of the capsule and designed to guide a fluid from the at least one overflow aperture to at least one recess being designed to receive the dedicated opening means of the beverage preparation machine.

Hence, when fluid is injected to the capsule, e.g. by piercing the inlet face, it is made to interact with the ingredients enclosed within the compartment. With a continuous fluid injection into the capsule, the fluid level within the capsule rises and thus, the beverage resulting from the interaction of the fluid and the beverage ingredients provided within the ingredients compartment exits the compartment via the at least one aperture of the wall member.

Preferably, the at least one preformed channel is arranged in an interstitial space between the outlet face and the cover sealed to the outlet face. Thereby, for avoiding an adhesion of the cover to the wall member constituting the outlet face of the capsule, gas under pressure is preferably enclosed by the cover sealed to the rigid wall member constituting the outlet face of the capsule. The adhesion of the wall member and the cover is effectively prevented. Accordingly, opening of the capsule by dedicated opening means which preferably shear at least a portion of the cover connected to the wall member is facilitated.

Due to the gas pressure and the puffing of the cover, the wall member can be placed at the outermost side of the capsule opening while avoiding the cover to stick to the wall member and enabling to safe as much as possible place for the ingredients in the capsule compartment. This puffing also provides an aesthetic aspect to the capsule.

The at least one preformed channel is preferably formed in the rigid wall member. Thereby, the beverage being dispensed from the ingredients compartment by means of the at least one aperture provided in the outlet face is preferably forced through the preformed channels by means of gravity.

The capsule according to the present invention may be asymmetrically shaped in order to facilitate a proper insertion in the brewing device by the user. For this, the capsule can have an elongated shape with an axial distance and a shorter transversal distance, wherein the outlet aperture and the recessed portion of the wall member are preferably aligned along the axial distance. As a result, the user is forced to insert the capsule in a predetermined orientation that is desirable for a correct operation of the capsule as aforementioned.

BRIEF DESCRIPTION OF THE DRAWINGS

Further features, advantages and objects of the present invention will become apparent for the skilled person when reading the following detailed description of embodiments of the present invention, when taken in conjunction with the figures of the enclosed drawings.

FIG. 3b is a sectional side view of the opening means according to FIG. 3a.

DETAILED DESCRIPTION OF THE FIGURES

First of all, the general brewing principle of the invention will be explained in relation to FIGS. 1 and 2 and a preferred embodiment of the capsule according to the invention.

A capsule system 30 is provided that comprises a capsule 1 and a beverage preparation device 10. For simplicity, the beverage preparation device is only schematically depicted and may, in reality, comprise additional technical features within the normal knowledge of the person skilled in the art.

The capsule 1 comprises an ingredients compartment 2 containing beverage ingredients such as leaf tea and the like. The ingredients compartment is demarcated by a cup-shaped housing 32 and a wall member 4. Thereby, the capsule 1 comprises an inlet face 6a which is constituted by a portion of the cup-shaped housing 32. Moreover, the capsule comprises an outlet face 6b which comprises the wall member 4 and a cover 11 overlaying the wall member Preferably, a filtering wall 33 is fixedly attached to peripheral inner step 34 of the housing 32, thereby enclosing the beverage ingredients within the cup-shaped housing. The ingredients compartment is preferably impermeable to gas and light.

The housing 32 may encompass different cross sections such as a circular, ellipsoid, square, rectangular or polygonal section that determine as a matter of fact the general profile of the filtering wall 33. The ingredients compartment is sized to accommodate a dose of leaf beverage ingredient of typically about between 1 to 10 grams, preferably 2 to 5 grams. The dose of leaf ingredient may depend on the final volume of beverage to produce. For an individual cup of tea, a typical dose can be of about 2 grams whereas for a tea pot, a typical dose can be of about 8 to 10 grams. As clearly apparent in FIG. 1, the capsule is positioned relative to the brewing device so that the wall member 4 and the filtering wall 33 extend substantially vertical and from substantially the bottom of the enclosure. For this, the capsule is preferably positioned in a 'vertical' arrangement in the beverage preparation device 10. Thus, the cup-shaped housing 32 is preferably oriented with its inlet and outlet faces 6a, 6b being orientated essentially vertically.

At the outlet face 6b, the wall member 4 preferably comprises at least one overflow aperture 22. The at least one overflow aperture 22 is in fluid communication with the ingredients compartment 2.

Figure 5:
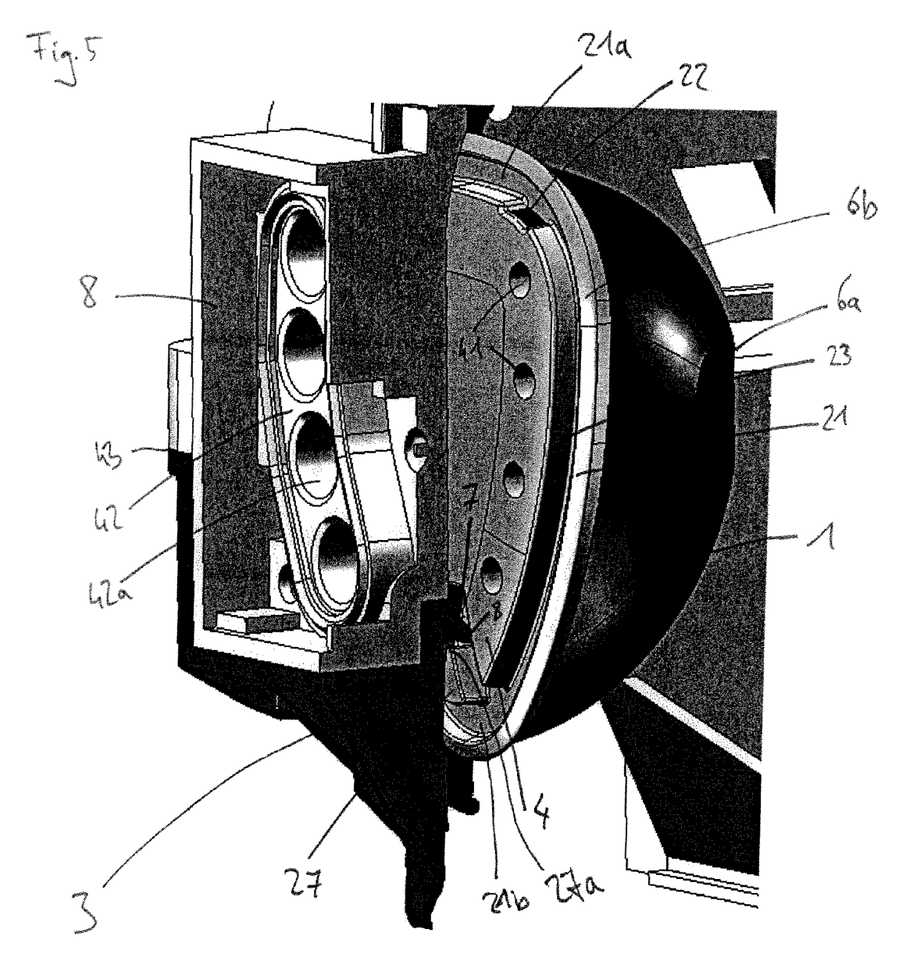
FIG. 5 is a perspective side view of a preferred embodiment of the capsule and the opening means according to the present invention interacting with each other.
Figure 6:
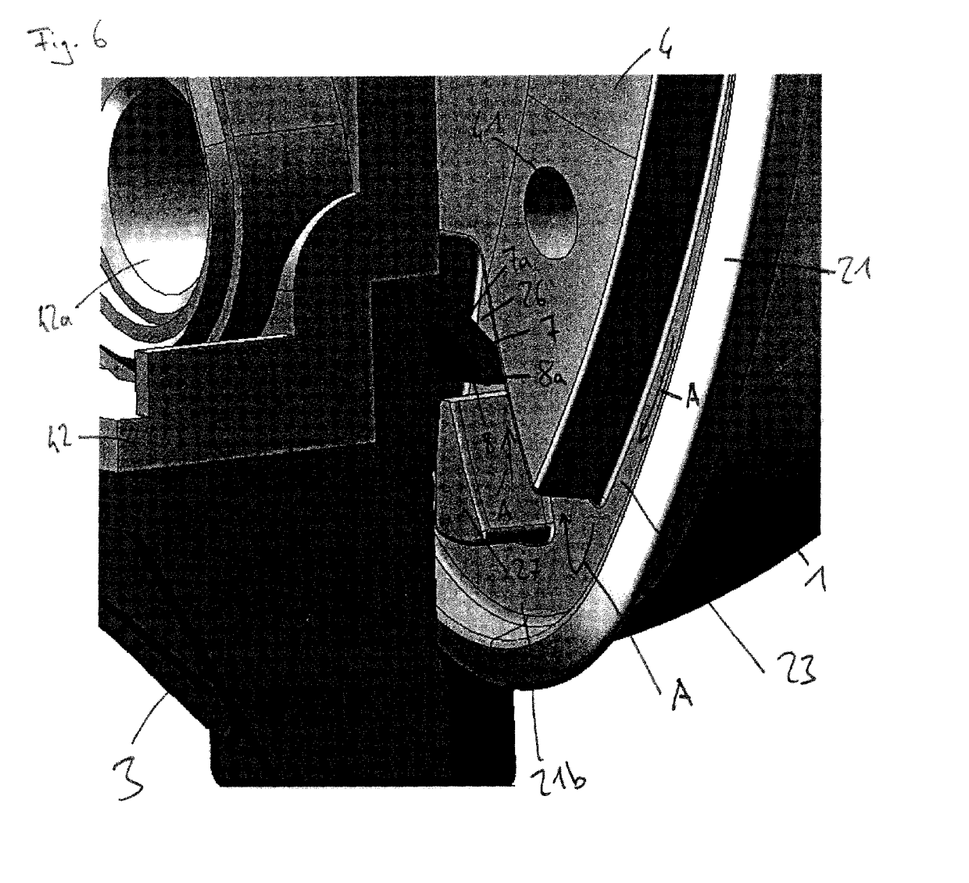
FIG. 6 is an enlarged perspective side view of the embodiment of the capsule and the opening means according to FIG. 5.

The capsule 1 is closed by the cover 11 that hermetically closes the enclosure of the capsule 1 and thus, the ingredients compartment 2 and the wall member 4. The cover 11 is preferably attached to an outer circumferential rim portion 21 of the housing 32, for example a flange as illustrated in FIGS. 5 and 6. Thereby, a channel 23 is formed at the outlet face of the capsule 1 which is designed to guide a fluid downward from the at least one overflow aperture 22. The second rim portion 21b is preferably essentially opposite to the first rim portion 21a at which the aperture of the cover member is provided. Accordingly, liquid which exits the ingredients compartment by means of aperture 22 is guided essentially parallel to the outlet face 6b of the capsule 1 downward.

Both the cover 11 and the housing 32 can be made of oxygen barrier materials and the enclosure can be substantially free of oxygen so that the freshness of the beverage ingredients can be preserved during an extended period of time. The sealing wall is preferably a flexible and puncturable sealing cover, e.g. a monolayer or a multi-layer cover, typically, laminates of PET/Aluminium/PP, PE/EVOH/PP, PET/Metallised/PP, Aluminum/PP, paper.

The enclosure may contain flushed gas such as $N_2$, $N_2O$ or $CO_2$.

The housing can be manufactured industrially at lower cost by plastic thermoforming or aluminium deep drawing.

The beverage preparation brewing device 10 preferably comprises two enclosing members 8,9 which are designed to enclose the capsule 1 within a receiving chamber 5 of the device to which the capsule can be provided by a user. The enclosing members 8,9 are configured to hold the capsule in the 'vertical' arrangement as defined. Thereby, preferably at least one of the enclosing members 8,9 is connected to a closing mechanism (not shown) for selectively moving the enclosing members 8,9 with respect to each other. Thus, by operating the closing mechanism, the at least one enclosing member connected to the closing mechanism is moved relative to the other enclosing member. Accordingly, the enclosing members 8,9 can be brought from a first capsule insertion position as shown in FIG. 1 to a capsule enclosing position as shown in FIG. 2.

These enclosing members 8,9 can be machine jaws or any suitable mechanical enclosing means that can open and close about the capsule and can maintain it firmly in place. There is no need for providing high closing forces since the involved fluid pressure in the capsule remains relatively low and, preferably, as close as possible to the atmospheric pressure. Also, since the capsule can withstand the low brewing pressure, the capsule does not necessarily need to be entirely enclosed but simply held water tightly in place during brewing. This participates to a simplification of the device and it reduces machine costs.

The beverage preparation device comprises an external or internal liquid supply 11, such as a water tank, a water pump 12, heating means 37, e.g. a thermoblock, and a hot water injection line 35 that is managed through the enclosing member 9. The beverage preparation device may also comprise a controller and a user interface board (not shown) to manage the beverage preparation cycles as known in the art.

A backpressure valve 36 may be provided at the entry side of an injection member 39 (such as a needle(s) or blade(s) and a water inlet) in the capsule.

The brewing device further comprises opening means 3 which are designed to shear the cover 11 by interaction with the wall member 4 of the capsule. The opening means 3 are preferably connected to one of the enclosing members 8. Thereby, the opening means 3 are configured to open the cover 11 of the capsule by creating an outlet aperture 38. Preferably, the opening means 3 are designed to shear the cover 11 by interacting with a dedicated shearing member 27 (see FIG. 4) of the wall member 4.

Figure 1:
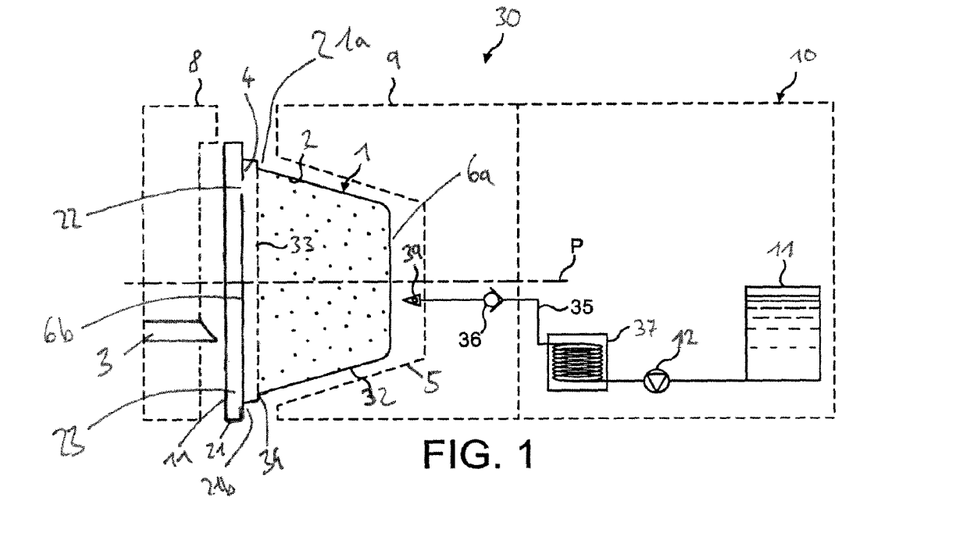
FIG. 1 is a schematic drawing of a preferred embodiment of a beverage preparation device according to the present invention in a capsule insert position.
Figure 2:
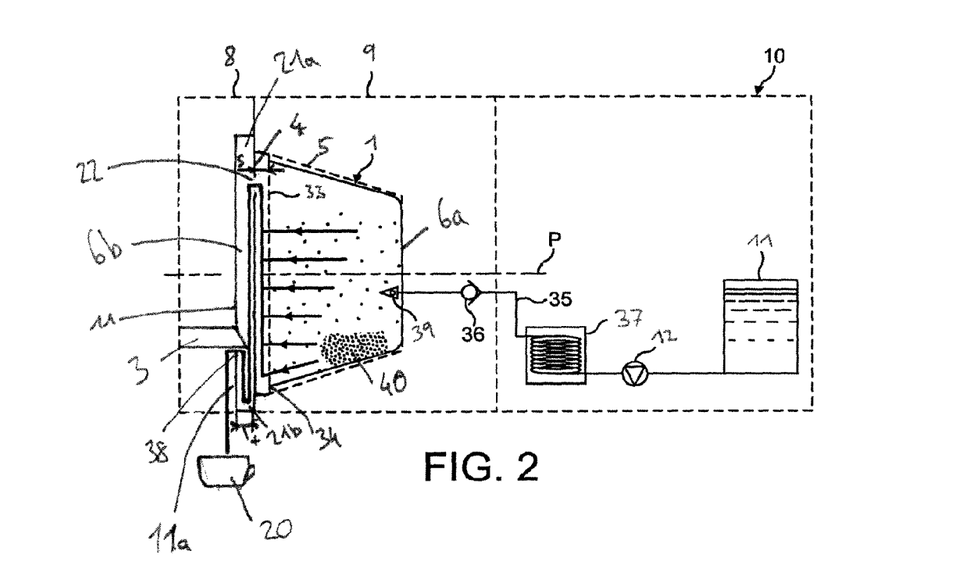
FIG. 2 is a schematic drawing of the beverage preparation device of FIG. 1 in a capsule enclosing and extracting position.

The opening of the cover 11 and thus, the engagement of the opening means 3 and the wall member 4 preferably takes place when the enclosing members 8,9 of the device 10 are brought from their capsule insertion position as shown in FIG. 1 into their capsule enclosing position as shown in FIG. 2. The movement of the enclosing members 8,9 with respect to each other may be a linear or a swiveling movement, or a combined linear and swiveling movement.

In the brewing operation as shown in FIG. 2, the wall member 4 constitutes an overflow wall with the aperture 22 acting as overflow aperture. Thereby, the capsule is preferably orientated in the device such that the overflow aperture 22 is above a median horizontal plane P of the capsule.

As also apparent in FIG. 2, the filtering wall 33 and the wall member 4 are spaced apart a short distance sufficient to create an interstitial space 's' that is supposed, without being bound by theory, to work as a sort of 'siphon' that can promote the upward motion of the denser beverage portion that is predominantly localized in the bottom of the enclosure. The interstitial space can range of from 0.1 to 8 mm, preferably, about 0.5 to 3 mm.

In relation to FIG. 2, the method of the invention works as follows. The capsule is inserted in the beverage preparation device and the capsule enclosing members 8, 9 are closed about the capsule to position it with the inlet and outlet face 6a, 6b being substantially vertically oriented. Thereby, the opening means 3 create an outlet aperture 38 in the cover 11 sealed to the capsule rim 21. On the opposite side of the capsule, the fluid injection member 39 is introduced in the capsule's ingredients compartment 2. Hot water is thus injected into the capsule at relatively low pressure, preferably, at a pressure not exceeding 0.2 bar. Hot water slowly fills the capsule and submerges the beverage ingredients in the enclosure. The brewed beverage is filtered through the filtering wall 33. A denser portion 40 of the beverage may tend to settle in the bottom of the enclosure; which portion is also filtered through the filtering wall 33 since it is properly placed adjacent this portion. The denser beverage is evacuated through the interstitial space 's' as caused by the variation of pressure between the lower part of the space and the upper part of said space therefore acting similarly to a 'siphon'. The rest of the beverage is also filtered also by passing through the filtering wall 33 at different vertical levels up to the upper level of the fluid in the enclosure and is evacuated to the overflow aperture 22.

It should be noted that the overflow aperture 22 should preferably be placed above the median of the total height of the ingredients compartment and even preferably be placed above the ⅘ of the total height thereof; thus ensuring a more complete submergence of the beverage ingredients and a slower evacuation of the beverage from the compartment which favors a better infusion process.

The 'total height' of the compartment is meant to be the total distance separating the lowermost point of the compartment to the uppermost point thereof when the capsule is positioned in the beverage device ready for the brewing operation. In a possible mode, the filtering wall 33 can be substantially equal to the total height of the compartment.

The outlet opening 38 created in the cover 11 is preferably positioned downwardly the aperture 22. Hence, liquid being ejected from the overflow aperture 22 is guided essentially parallel to the outlet face 6b of the capsule before reaching the outlet opening 38 of the capsule. For the guidance of the beverage between aperture 22 and outlet opening 38, at least one guiding channel 23 (see FIG. 3) is preferably arranged at the outlet face 6b of the capsule.

After ejecting from the capsule 1, the beverage is preferably guided by guiding means 13 of the opening means of the beverage machine (see FIG. 3a, 3b) towards a receptacle 20 such as for example a cup or a mug.

Figure 3A:
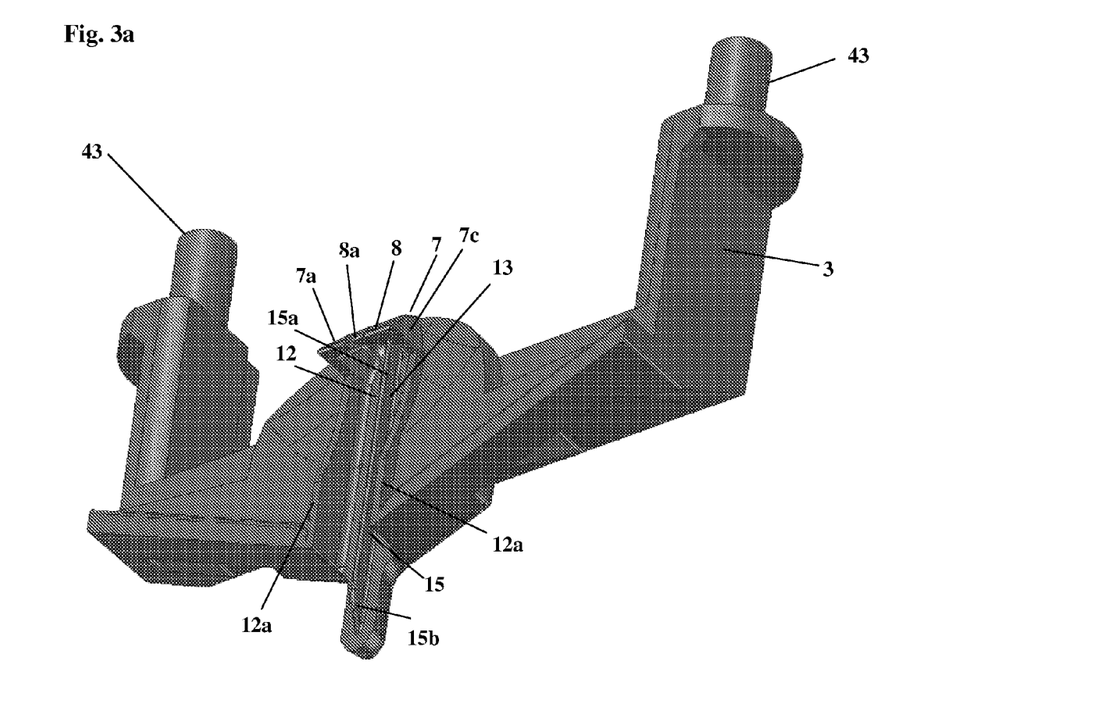
FIG. 3a is a perspective view of a preferred embodiment of the opening means according to the invention.
Figure 3B:
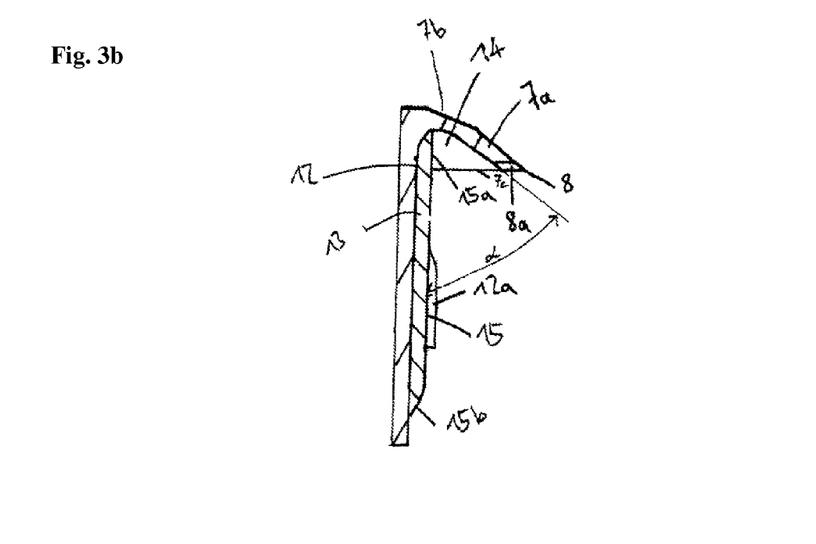

A preferred embodiment of the opening means according to the present invention will now be described with reference to FIGS. 3a and 3b, wherein 3a is perspective view of the opening means and FIG. 3b is a sectional side view of the opening means.

The opening means are preferably made of plastic material by means of injection moulding. As can be seen in FIG. 3a, the opening means 3 preferably comprise connection members 43, for example pins, which are designed to enable a connection between the opening means 3 and an enclosing member 8 of the device 10 (cf. FIG. 5).

The opening means 3 comprise an opening member 7 protruding from an essentially vertically arranged base portion 12 of the opening means 3. The opening member 7 is preferably a hook-shaped member which is arranged slanted at an angle α with respect to the base 12 of the opening means 3. The angle α preferably lies between 40 and 65°.

The hook-like member 7 comprises a slanted wall portion 7a and two side wall portions 7c which enclose a hopper-shaped recess 14. A longitudinal edge of the slanted wall portion 7a constitutes the cutting edge 8 of the hook-like member 7. Thereby, the longitudinal edge portion 8 is preferably arranged essentially horizontal within the device 10. Optionally, the longitudinal cutting edge 8 may comprise a central recession 8a to avoid that the opening member 7 bumps against the edge 27a (see FIG. 4) of the shearing member. The longitudinal edge 8 is preferably between 1 and 25 mm.

Accordingly, a large opening in the cover is provided when the hook-like member 7 is engaging with the cover 11 of the capsule.

When the opening member 7 is made to cut the cover 11 (cf. FIG. 2), a portion of the cover 11 is deflected by the upper surface 7b of the hook-like member 7. Thereby, the upper surface 7b may be curved or gradually stepped as indicated in FIG. 3b.

The base of the opening means 3 is preferably disposed between two vertically arranged side walls 12a, thereby constituting an open fluid channel 13 for guiding the liquid provided to the hopper-shaped collecting member 14 to a receptacle 20 positioned underneath the opening member 3 (cf. FIG. 2).

Furthermore, from the base portion 12 respectively from the open channel 13, an essentially vertically arranged ridge 15 is protruding. Thereby, an upper portion 15a of the ridge 15 preferably protrudes from the center of the hopper-shaped collecting member 14. From there, the protruding ridge 15 extends within the guiding means 13 towards a lower end portion 15b thereof, said lower end portion 15b is designed to act as a tearing edge of the guiding means 13. Accordingly any beverage ejected through the outlet opening 38 of the capsule 1 is collected by the recessed collecting member 14 and is then guided by means of the guiding means 13 towards a receptacle 20. Thereby, any remaining drops of the beverage are guided by means of gravity towards a lower end portion of the ridge 15 at which tip the drops are torn off such that essentially no beverage remains sticking at/or within the guiding means. Hence, cross contamination can be effectively minimized.

Moreover, due to the channel or groove-like design of the guiding means 13, the provision of common guiding means such as for example a tube can be prevented and thus, the remaining of liquid staying inside the guiding means can be prevented.

Figure 4:
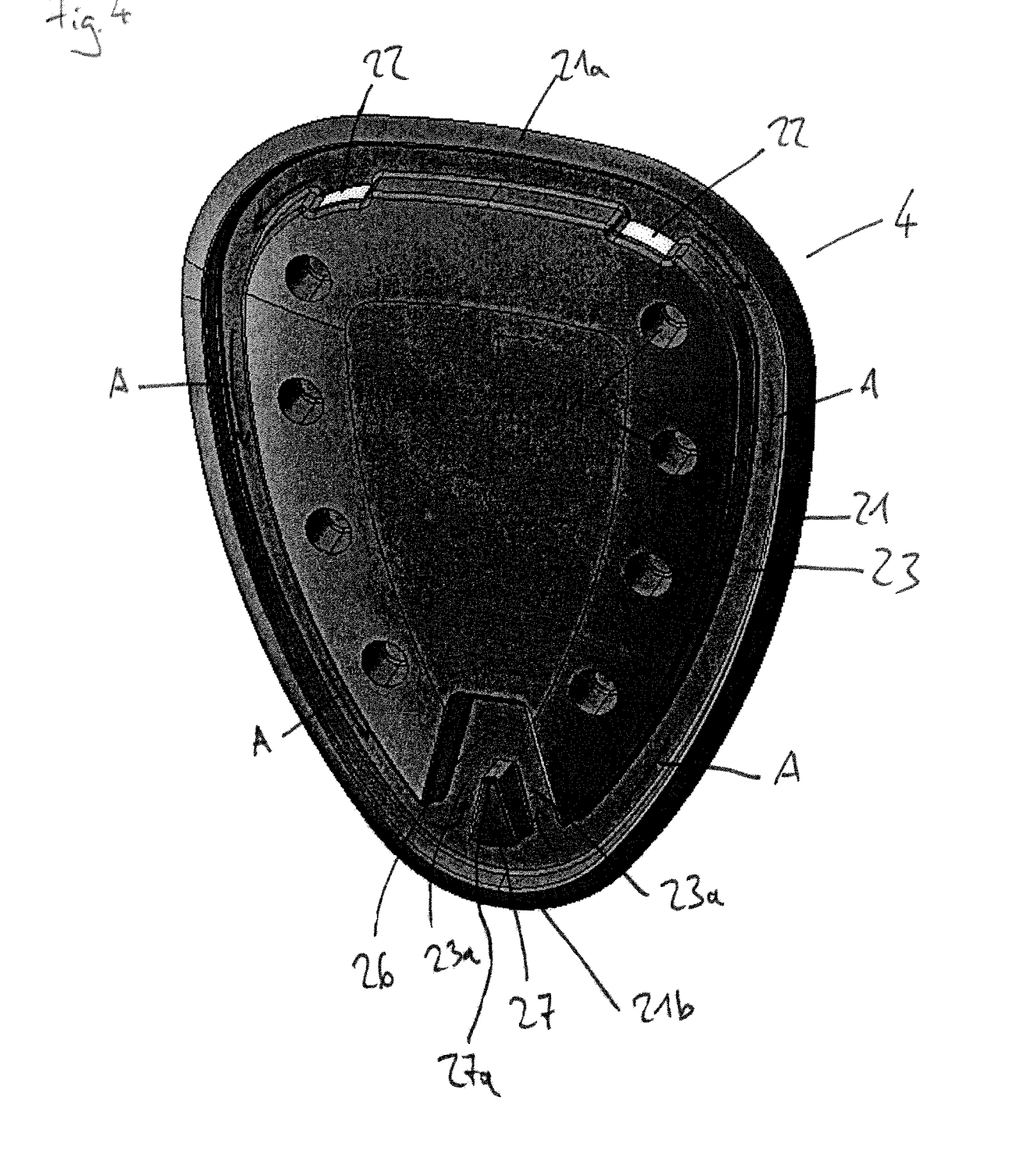
FIG. 4 is a perspective view of a preferred embodiment of the wall member of the capsule according to the present invention.

FIG. 4 shows a preferred embodiment of the wall member 4 according to the present invention which is preferably connected to the capsule housing 32. The wall member 4 is preferably made of plastic material by injection molding. As shown in FIG. 4, the wall member comprises a preformed channel 23 arranged at the circumference of the wall member 4. Thereby, the preformed channel 23 is in fluid connection with at least one aperture 22 being in fluid connection with the ingredients compartment 2 (c.f. FIGS. 1 and 2). Preferably, as shown in FIG. 4, two apertures 22 are provided at an upper portion of the wall member 4.

As indicated by arrows A, the pre-formed channel 23 is designed to guide beverage which is ejected from the apertures 22 at an upper portion of the wall member 4 towards a lower portion of the wall member. The preformed channel 23 preferably comprises no sharp corners or edges such that the liquid can be smoothly guided from aperture 22 towards the lower portion.

In order to provide sufficient space for the beverage to be guided by the interstitial space between the cover 11 and the wall member 4, i.e. by the preformed channel 23, the interstitial space 't' is preferably between 1 and 10 mm. (cf. FIG. 2).

At its lower portion 21b, the wall member 4 comprises a recess 26 which is designed to accommodate the hook-shaped opening member 7 of the opening means 3 during an engagement of the opening means 3 and the capsule 1.

The recess 26 is in fluid connection with the preformed channel 23.

In addition, a shearing member 27 is provided within the recess 26 which is designed to interact with the longitudinal cutting edge 8 of the opening member 7. The shearing member 27 holds up the cover 11 when the opening member 7 comes into contact with it which increases the tension on the cover 11 and facilitates its shearing. Thereby, the shearing member 27 is preferably wedge-shaped, having a linear shearing edge which is preferably arranged in parallel to the longitudinal cutting edge 8 of the opening member 7 during interaction of the opening means 3 and the capsule 1.

Furthermore, the wall member 4 may comprise additional apertures respectively holes 41 which are preferably arranged at a center portion of the wall member 4. Said recesses or holes 41 are designed to enable an interaction of the wall member 4 with dedicated decoding means (not shown) of the device in order to determine the particular ingredients provided within the capsule 4. Thus, the nature of the ingredients contained within the capsule can be decoded by means of dedicated pins which are provided at the enclosing member 8 to enable the identification of the type of capsule to be extracted. Accordingly, for example the brewing parameters of the capsule may be altered by the device as explained in EP 1 950 150.

It should be noted that the apertures 22 are preferably preformed apertures which do not need to be pierced by any opening means. However, the apertures 22 may be equipped with filter elements in order to prevent any leaf tea to leave the ingredients compartment 2.

FIG. 5 is a perspective side view of a preferred embodiment of the capsule and the opening means interacting with each other.

As shown, the opening means 3 are connected to the enclosing member 8 by means of the connection pins 43. It should be noted that the enclosing members 8 and 9 can be moved relatively to each other in order to assume a first capsule insertion position (cf. FIG. 1) and a second capsule enclosing position (cf. FIG. 2) by means of a linear movement. However, the first and second enclosing members 8, 9 may as well be moved relatively to each other by means of a combined linear and swiveling movement.

As the enclosing member 8 is approached to the outlet face 6b of the capsule, at which the wall member 4 is provided, the hook-shaped opening member 7 punctures the cover 11 sealed to the wall member 4 at the outlet face 6b. Please note that the cover 11 is not depicted in FIG. 5. Thereby, preferably gas is enclosed by the cover 11 such that the surface of the cover puffs out at the outlet face of the capsule and thus, puncturing respectively cutting of the cover 11 by means of the opening member 7 is facilitated.

The opening of the cover 11 is particularly obtained by shearing the cover between the shearing member 27 abutting on the inner surface of the cover 11 and the longitudinal cutting edge 8 of the opening member 7. Thereby, a linear shearing edge 27a is preferably interacting with the longitudinal cutting edge 8 and/or a recess 8a provided preferably at a center portion of the longitudinal cutting edge 8 such that cover 11 is sheared there between. Thereby, a portion of the cover 11 is inwardly deflected towards the recess 26 of the wall member 4 of the capsule in which the hook-shaped member 7 is accommodated.

The enclosing member 8 may be equipped with identification means 42 which comprise recesses 42a in which pins (not shown) are guided which enable an identification of the inserted capsule 1 by means of interacting with holes or recesses 41 provided at a wall member 4 of the capsule. Thereby, the cover 11 sealed to the wall member 4 may be punctured at a central portion thereof for enabling identification.

FIG. 6 is an enlarged perspective view of the embodiment of the capsule and the opening means according to FIG. 5.

As shown in FIG. 6, the hook-shaped opening member 7 is preferably fully received in the recess 26 of the wall member 4. Please note that again the cover 11 is not shown in FIG. 6.

According to that, the portion of the cover 11 is fully deflected towards the center of the capsule 1 due to the slanted surface 7a of the hook-shaped member 7. Hence, an outlet opening 38 (cf. FIG. 2) is created which is large enough to enable an ejection of the liquid from the capsule without a pressure rise within the capsule. In particular, due to the deflection of the sheared cover 11, no parts of the cover obstruct the created outlet opening 38. Moreover, since the hook-shaped member 7a is fully received in the dedicated recess 26 of the wall member 4, the opening means 3 do not obstruct the created outlet opening 38 as well.

As indicated by arrows A, beverage is ejected from the apertures 22 and guided by means of the preformed channel 23 at a rim portion 21 of the capsule to the created outlet opening 38. Thereby, the beverage is collected by the hopper-shaped collecting recess 14 of the hook-shaped member 7 and is thus guided by means of the guiding means 13 towards a receptacle 20. Thereby, as the hopper-shaped collecting recess is formed at a base portion 12 of the opening means 3, and due to the fact that the beverage approaches the hook-shaped member 7 from below, the opening means 3 and in particular the opening member 7 does not obstruct the created outlet opening 38 and thus, the creation of pressure within the capsule can be effectively prevented during brewing. Hence, the ejection characteristics of the capsule are significantly enhanced.

Although the present invention has been described with reference to preferred embodiments thereof, many modifications and alternations may be made by a person having ordinary skill in the art without departing from the scope of this invention which is defined by the appended claims.

The invention claimed is:

1. A system comprising a beverage preparation device and a capsule for preparing a beverage from a food substance contained in a compartment of the capsule by injecting a liquid into the capsule, the beverage preparation device having an opener which is designed to interact with a wall member provided at an outlet face of the capsule,
    wherein the opener comprises an opening member having a hook shape designed to shear and move away at least a portion of a cover sealed to the outlet face of the capsule, and the cover of the capsule is overlaying the wall member of the capsule.

2. The system of claim 1, wherein the opening member is a hook member which is designed to deflect at least a portion of the cover towards an upper face of the hook member.

3. The system of claim 1, wherein the hook member is curved or slanted with respect to a vertically arranged base of the opener.

4. The system of claim 1, wherein the opener comprises an integrally formed guide designed to redirect a beverage from the capsule to a receptacle.

5. The system of claim 4, wherein the guide comprises a recessed collecting member situated at a base of the opener.

6. The system of claim 1, wherein gas under pressure is enclosed by the cover sealed to the outlet face of the capsule.

7. The system of claim 1, wherein the beverage preparation brewing device comprises enclosing members designed to enclose the capsule within a receiving chamber into which the capsule is inserted, and the beverage preparation brewing device further comprises a liquid supply, a water pump, a heater, and an injection member that injects the liquid into the capsule.

8. A system comprising a beverage preparation device and a capsule for preparing a beverage from a food substance contained in a compartment of the capsule by injecting a liquid into the capsule, the beverage preparation device having an opener which is designed to interact with a wall member provided at an outlet face of the capsule,
    wherein the opener comprises an opening member having a hook shape designed to shear and move away at least a portion of a cover sealed to the outlet face of the capsule, the opener comprises an integrally formed guide designed to redirect a beverage from the capsule to a receptacle, wherein the guide further comprises an essentially vertical ridge protruding from the base of the opener.

9. The system of claim 8, wherein a tearing edge of the guide is constituted by a tip of the vertical ridge.

10. The system of claim 8, wherein the beverage preparation brewing device comprises enclosing members designed to enclose the capsule within a receiving chamber into which the capsule is inserted, and the beverage preparation brewing device further comprises a liquid supply, a water pump, a heater, and an injection member that injects the liquid into the capsule.

11. The system of claim 8, wherein the cover of the capsule is overlaying the wall member of the capsule.

12. A capsule for preparing a beverage in a beverage machine comprising:
    an ingredients compartment;
    a wall member provided at an outlet face of the capsule, the wall member comprising at least one overflow aperture in fluid communication with the ingredients compartment; and
    a cover sealed to the outlet face, and the wall member comprises a shearing member abutting on the cover and designed to interact with a dedicated opener of the beverage preparation machine such that during opening of the machine at least a portion of the cover is sheared between the shearing member and the opener.

13. The capsule of claim 12, wherein the wall member is provided with at least one preformed channel at the outlet face of the capsule and designed to guide a fluid from the at least one overflow aperture to the least one recess being designed to receive the dedicated opener of a beverage preparation device.

14. The capsule of claim 12, wherein the cover is a monolayer or a multi-layer cover comprising at least aluminium.

15. The capsule of claim 12, wherein a gas is enclosed by the cover sealed to the outlet face of the capsule and the pressure of the gas is sufficient to push out the cover.

16. A system comprising a beverage preparation device and a capsule for preparing a beverage from a food substance contained in a compartment of the capsule by injecting a liquid into the capsule, the beverage preparation device having an opener which is designed to interact with a wall member provided at an outlet face of the capsule,
    wherein the opener comprises an opening member having a hook shape designed to shear and move away at least a portion of a cover sealed to the outlet face of the capsule, and
    wherein the wall member of the capsule comprises at least one overflow aperture in fluid communication with the compartment, and the wall member of the capsule further comprises a shearing member abutting on the cover and designed to interact with the opener of the beverage preparation machine such that during opening of the machine at least a portion of the cover is sheared between the shearing member and the opener.

* * * * *